(12) United States Patent
Howieson

(10) Patent No.: US 8,438,908 B2
(45) Date of Patent: May 14, 2013

(54) LEAK DETECTION SYSTEM AND METHOD

(75) Inventor: Iain Howieson, Stirling (GB)

(73) Assignee: Cascade Technologies Limited, Stirling (GB)

( * ) Notice: Subject to any disclaimer, the term of this patent is extended or adjusted under 35 U.S.C. 154(b) by 256 days.

(21) Appl. No.: 12/517,655

(22) PCT Filed: Nov. 12, 2007

(86) PCT No.: PCT/GB2007/004313
§ 371 (c)(1),
(2), (4) Date: Jun. 4, 2009

(87) PCT Pub. No.: WO2008/068452
PCT Pub. Date: Jun. 12, 2008

(65) Prior Publication Data
US 2010/0064777 A1    Mar. 18, 2010

(30) Foreign Application Priority Data
Dec. 7, 2006 (GB) .................. 0624472.7

(51) Int. Cl.
*G01M 3/04* (2006.01)
(52) U.S. Cl.
USPC ........................................ 73/40.7
(58) Field of Classification Search ........... 73/40.7, 73/40, 40.5 A, 592, 49.2, 49.3; 356/436, 356/437, 576, 239.4
See application file for complete search history.

(56) References Cited

U.S. PATENT DOCUMENTS

| | | | |
|---|---|---|---|
| 3,969,077 A | 7/1976 | Hill | |
| 4,133,373 A | 1/1979 | Slagley et al. | |
| 4,419,883 A | 12/1983 | Gelston, II | |
| 5,834,632 A * | 11/1998 | Olender et al. | 73/40.7 |
| 6,157,033 A | 12/2000 | Chudnovsky | |
| 7,492,806 B2 * | 2/2009 | Day et al. | 372/101 |
| 2003/0026033 A1 | 2/2003 | Fioravanti et al. | |
| 2005/0157303 A1 | 1/2005 | Langford et al. | |

FOREIGN PATENT DOCUMENTS

| | | |
|---|---|---|
| JP | 01301138 | 12/1989 |
| JP | 07063634 | 3/1995 |
| JP | 08015497 | 1/1996 |
| JP | 11030564 | 2/1999 |
| JP | 2001311793 | 11/2001 |
| RU | 2087888 | 8/1997 |
| RU | 2215933 | 11/2003 |
| RU | 2313078 | 12/2007 |
| SU | 1381354 | 3/1988 |
| WO | WO03/087787 A1 | 10/2003 |
| WO | WO 2008/068452 | 6/2008 |

OTHER PUBLICATIONS

International Search Report for PCT/GB2007/004313, dated Jan. 29, 2008.
Office Action issued by the Russian Patent Office regarding RU2009125922, dated Oct. 19, 2011.

* cited by examiner

*Primary Examiner* — Daniel Larkin
*Assistant Examiner* — Jamar Ray
(74) *Attorney, Agent, or Firm* — Moore & Van Allen, PLLC; W. Kevin Ransom

(57) ABSTRACT

A leak detector (1) adapted to detect a leak (40) of a first material by detecting a change in a physical/chemical property of a second material. The leak detector includes a quantum cascade laser (5) and a detector (35).

23 Claims, 1 Drawing Sheet

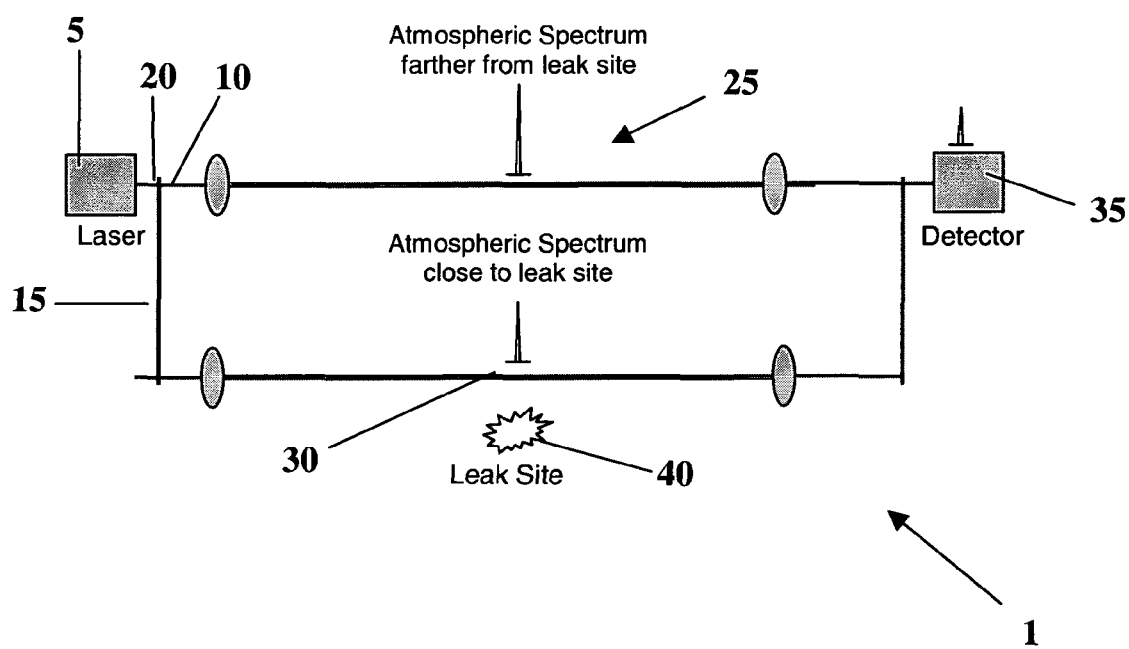

LEAK DETECTION SYSTEM AND METHOD

FIELD OF THE INVENTION

This invention relates to a system and method for leak detection. In particular, the invention relates to gas leak detection that is non-specific to the leaked gas.

BACKGROUND OF THE INVENTION

In many industries that handle gaseous materials, considerations such as efficiency improvements and health and safety requirements are leading to increasing demands on gas leak detection technology. Examples of applications where detecting leaks is critical include butane fill lines at aerosol plants and natural gas pipelines, where the safety implications of a leak are self-evident.

In prior art leak detectors, the presence or concentration of a leaking gas is directly detected or measured by one of a variety of techniques such as photo-ionisation, flame ionisation, photo acoustic effects or infra-red (IR) absorption. These techniques have several disadvantages, including the need to produce and purchase a dedicated detector for each gas used. In addition, some gasses are inherently unsuitable for use with certain detection techniques, because they do not strongly adsorb infrared radiation or they absorb in a region masked by other materials having stronger absorbing characteristics.

SUMMARY OF INVENTION

According to a first aspect of the present invention, there is provided a leak detector that is adapted to detect a leak of a first material by detecting a change in a physical and/or chemical property of a second material.

The physical property may be concentration and/or pressure and/or a property dependant upon concentration or pressure such as IR absorption or change in IR absorption lineshape.

The leak detector may be arranged to detect a leak of the first material by detecting a reduction in concentration of the second material that is caused by displacement due to the leak of the first material.

By monitoring the concentration of, for example, a gas that surrounds a pipe that contains a fluid or another gas, leaks from the pipe can be detected by identifying displacement of the surrounding gas. This provides an indirect, but highly effective technique for detecting leaks.

Identifying a leak indirectly by detecting displacement rather than directly detecting the leaking material provides several advantages including allowing the detector to monitor for any leaking material, irrespective of the material involved, rather than being specific to a certain detected material. This has cost advantages as it allows the sensor manufacturer to produce or stock fewer sensor types and it allows users to replace multiple leak detectors that are each specific to certain materials with a single universal leak detector.

Detection of the second material may include measuring its concentration or monitoring a property dependant on its concentration. The second material may be a located outside a vessel, for example a pipe. The first material may be located within the vessel, for example, the pipe.

The detector may be arranged to detect at least partial displacement of the second material by the first material in the event of a leak.

The first material may be a fluid, for example, a gas or a vapour or a liquid. The first material may include oxygen and/or nitrogen and/or helium and/or natural gas and/or butane. The second material may be a gas, for example carbon dioxide, or a vapour, for example water vapour.

Use of the detector in which the invention is embodied allows detection of leaking materials using techniques that are unsuitable for detection of those materials. For example, oxygen, nitrogen and helium do not absorb in the IR wavelengths and are therefore unsuitable for detection by conventional IR absorption based leak sensors. However, by detecting a change in concentration of atmospheric constituents such as carbon dioxide or water that do absorb strongly at IR wavelengths, this type of detector may be used to measure leaks of materials exhibiting poor or no IR absorption.

Even where the detector is to be used for detection of leak materials that absorb at IR wavelengths, appropriate selection of the second material permits the detection of materials having stronger IR absorption than is exhibited by the leaking material, which can be utilised to increase the sensitivity of the detector. In addition, material may be selected that absorbs at wavelengths that enable low cost detector components to be used.

The leak detector may be operable to sense leaks at two or more locations. At least one sensing location may be a different distance from a leak or potential leak site than at least one other sensing location. The leak detector may be adapted to detect a leak by comparing a signal that is dependant on the concentration of the second material at a first location with at least one corresponding signal that is dependant on the concentration of the second material at one or more other locations.

The leak detector may include one or more sensors for detecting changes in the concentration of the second material. The sensor may include an IR light source and means for measuring IR absorption. The leak detector may be adapted to detect a leak of the first material by detecting changes in IR absorption of the second material. The light source may be a laser, preferably a quantum cascade (QC) laser and most preferably a pulsed QC laser.

Alternatively or additionally, the leak detector may include means for determining IR absorption lineshape associated with the second material. Further means may be provided for analysing changes in absorption lineshape to thereby detect a leak.

The use of a pulsed QC laser allows ultra fast measurements to be taken. The option of selecting the displacement material, rather than being restricted to the material to be detected allows selection of measurement materials having absorption features at wavelengths for which there are lasers cheaply or conveniently available.

According to a second aspect of the present invention, there is provided a method of detecting a leak including identifying a leak of a first material by detecting a change in physical property of a second material.

The detected physical property may be concentration and/or pressure and/or a property dependant upon concentration or pressure such as IR absorption or change in IR absorption lineshape.

The method may be a method for detecting a gas leak, wherein the first and second materials are gases. The first material may be located inside a vessel, such as a pipe, container or tank. The second material may be located outside the vessel. Identification of a leak may involve detecting at least partial displacement of the second material by the first material.

The method may include measuring the concentration of the second material at two or more locations. Detection of a leak may be by comparing the concentration of the second material at a first location with the concentration of the second material at one or more second locations. At least one sensing location may be a different distance from a leak or potential leak site than at least one other sensing location.

Detection of the leak of the first material may be by measuring absorption of radiation at one or more IR wavelengths by the second material. The measurement may be by measuring absorption of the output of a laser, preferably a quantum cascade (QC) laser and most preferably a pulsed, chirped QC laser.

Each applied pulse may have a duration that is greater than 150 ns, in particular greater than 200 ns. Each applied pulse has a duration that is in the range of 150 to 300 ns, preferably 200 to 300 ns. This can provide a tuning range of about 60 GHz.

Each detected pulse may have a duration that is greater than 150 ns, in particular greater than 200 ns. Each detected pulse may have a duration that is in the range of 150 to 300 ns, preferably 200 to 300 ns.

Alternatively or additionally, leak detection may be by monitoring changes in IR absorption lineshape associated with the second material.

BRIEF DESCRIPTION OF THE DRAWINGS

The present invention will be described by way of example only with reference to FIG. 1, which shows a leak detection system.

DETAILED DESCRIPTION OF THE DRAWINGS

FIG. 1 shows a gas leak detection system 1 having a laser 5. The output of the laser 5 is split into two beams 10, 15 by beam splitter 20. The laser 5 is a pulsed quantum cascade (QC) laser. Both beams transmit light in an open path configuration through measurement zones 25 and 30 respectively to a detector 35. The distance between the leak site and each measurement zone must be different. The detector may be any suitable detector known in the art, such as a CCD, MCT or CMOS detector.

Any suitable laser 5 may be used. However, in a preferred embodiment, the laser is a chirped QC laser as described in WO03/087787, the contents of which are herein incorporated by reference. The wavelength up-chirp exhibited by the pulsed QC laser can be used to provide a wavelength scan. The wavelength up-chirp is induced by a heating effect occurring for the entire duration of the applied current/voltage drive pulse.

For QC lasers, the wavelength up-chirp has been shown to be continuous. The wavelength up-chirp can be made almost linear with respect to time, which allows the entire spectral region to be recorded within each individual or single pulse. This involves sampling the detected pulse along its entire length to obtain a range of spectral elements from that single pulse. This allows for faster measurements, as an entire or significant portion of a spectrum can be measured for an individual pulse. Repeated measurements can be made to provide an increased signal to noise ratio for a given measurement time relative to measurements taken using a laser in which only one spectral element can be measured per pulse. The ultra fast measurements achievable with a QC laser allow a near simultaneous measurement to be taken of each of the measurement zones 25, 30. This minimises errors due to homogeneous changes that occur throughout the bulk of the measurement atmosphere.

The laser 5 is selected to output a wavelength that is readily absorbed by an atmospheric constituent present at the measurement zones 25, 30, such as water or carbon dioxide. The two beams 15, 20 and thus respective measurement zones 25, 30 are displaced relative to each other such that they each sample a different area with respect to any potential leak site 40. The measurement zones 25 and 30 are asymmetrically positioned with respect to potential leak sites such that the distance between the potential leak site(s) and each measurement zone is different. The transmission spectrum collected from each measurement zone 25, 30 is measured at detector 35 and then one spectrum is subtracted from, or divided by, the other.

When there is no leak, suitable positioning of the measurement zones 25, 30 coupled with natural atmospheric mixing and the ultra fast measurement possible with pulsed quantum cascade lasers results in substantially identical or similar transmission spectra for each measurement zone 25, 30. This results in a zero or near zero differential between the two spectra. When a leak forms, the escaping gas will at least partially displace the atmospheric constituents. This upsets the balance of natural mixing, with the atmospheric constituents at the measurement zone 30 closer to the leak site being displaced before the atmospheric constituents at the measurement zone 25 further from the leak site. Therefore, the presence of a response in the differential of the two spectra serves as a positive indication of the presence of a leak.

As well as identifying a leak, the detector of the invention can provide a measure of the leak rate. This can be done using the magnitude of the differential. In practice, the leak rate may be determined by referring the magnitude of the differential to pre-stored calibration data. As the system operates on detection of a material other than the leaking material, a single set of calibration data relating to the atmospheric constituent being detected can be used, rather than having to recalibrate for each leak material.

The above description is made by way of example only and variations will be obvious to a person skilled in the art without departing from the scope of the invention. For example, although the measurement system is described having two beams 10, 15 and two measurement zones 25, 30, three or more beams and measurement zones may be used. In addition, although the system is described as having one laser 5 and one detector 35, multiple laser and/or detectors may be used. In an alternative example, rather than changes in the concentration of the second material being detected or monitored, other properties of the second material, such as pressure may be detected or monitored. An increase in pressure brings about a change in IR absorption lineshape, which can then be monitored to detect a pressure increase associated with the leak. Alternatively chemical changes could be monitored or detected. Accordingly the above description of the specific embodiment is made by way of example only and not for the purposes of limitation. It will be clear to the skilled person that minor modifications may be made without significant changes to the operation described.

The invention claimed is:

1. A leak detector adapted to detect a leak of a first gas or vapor by detecting a change in at least a physical property of a second gas or vapor, wherein the detector includes at least one sensor for detecting changes in the physical property of the second gas or vapor, the sensor including a radiation source and a detector for measuring or monitoring a change in absorption of radiation by the second gas or vapor.

2. A leak detector as claimed in claim 1, wherein the physical property of the second gas or vapor is at least one of a concentration, a pressure, or a property dependent upon at least one of a concentration or a pressure.

3. A leak detector as claimed in claim 1, wherein the leak detector is arranged to detect a leak of the first gas or vapor by detecting a reduction in concentration of the second gas or vapor that is caused by displacement due to the leak of the first gas or vapor.

4. A leak detector as claimed in claim 1, wherein the second gas or vapor is located outside a vessel and the detector is arranged to detect the leak of the first gas or vapor from within the vessel.

5. A leak detector as claimed in claim 1, wherein the second gas or vapor comprises at least one of water or carbon dioxide.

6. A leak detector as claimed in claim 1, wherein the first gas or vapor comprises at least one of oxygen, nitrogen, helium, natural gas, or butane.

7. A leak detector as claimed in claim 1, wherein the leak detector is operable to sense leaks at two or more locations.

8. A leak detector as claimed in claim 1, wherein the leak detector is adapted to detect a leak by comparing a signal that is dependent on a physical property of the second gas or vapor at a first location with at least one corresponding signal that is dependent on a physical property of the second gas or vapor at one or more other locations.

9. A leak detector as claimed in claim 1, wherein the leak detector comprises a plurality of sensors for detecting changes in a physical property of the second gas or vapor.

10. A leak detector as claimed in claim 1, further comprising a quantum cascade laser.

11. A leak detector as claimed in claim 10, wherein the quantum cascade laser comprises a pulsed, chirped quantum cascade laser.

12. A leak detector as claimed in claim 1, wherein the detector includes at least one sensor that comprises a source of radiation and a detector for measuring or monitoring at least one of a change in an absorption characteristic or a change in absorption lineshape of the second gas or vapor at one or more infrared wavelengths.

13. A method for detecting a leak of a first gas or vapor by detecting a change in at least a physical property of a second gas or vapor by measuring or monitoring a change in absorption of radiation by the second gas or vapor.

14. A method as claimed in claim 13, wherein the physical property of the second gas or vapor comprises at least one of a concentration, a pressure, or a property dependent upon at least one of a concentration or a pressure.

15. A method as claimed in claim 13, wherein the first gas or vapor is located inside a vessel.

16. A method as claimed in claim 15, wherein the second gas or vapor is located outside the vessel.

17. A method as claimed in claim 13, further comprising detecting at least partial displacement of the second gas or vapor by the first gas or vapor.

18. A method as claimed in claim 13, further comprising measuring the physical property of the second gas or vapor at two or more locations.

19. A method as claimed in claim 18, further comprising comparing the physical property of the second gas or vapor at a first location with the physical property of the second gas or vapor at one or more other locations.

20. A method as claimed in claim 13, further comprising at least one of measuring or monitoring at least one of a change of an absorption characteristic or a change in absorption lineshape of the second gas or vapor.

21. A method as claimed in claim 20 wherein the at least one of a change in an absorption characteristic or a change in absorption lineshape is measured at one or more infrared wavelengths.

22. A method as claimed in claim 20 further comprising measuring absorption of the output of a quantum cascade laser.

23. A method as claimed in claim 22, wherein the quantum cascade laser comprises a pulsed quantum cascade laser.

* * * * *